US005646694A

United States Patent [19]
Horita et al.

[11] Patent Number: 5,646,694
[45] Date of Patent: Jul. 8, 1997

[54] MOVING PICTURE DECODING APPARATUS HAVING THREE LINE BUFFERS CONTROLLED TO STORE AND PROVIDE PICTURE DATA OF DIFFERENT RESOLUTIONS

[75] Inventors: Kojiro Horita, Higashimurayama; Junichi Kimura, Hachioji, both of Japan; Hirotaka Hara, Pasadena, Calif.; Yutaka Okunoki, Kawaguchi, Japan

[73] Assignees: Hitachi, Ltd.; Sega Enterprises, Ltd., both of Tokyo, Japan

[21] Appl. No.: 554,966

[22] Filed: Nov. 13, 1995

[30] Foreign Application Priority Data

Nov. 17, 1994 [JP] Japan .................................. 6-283837

[51] Int. Cl.⁶ .................................................. H04N 7/01
[52] U.S. Cl. ........................ 348/448; 348/450; 348/441
[58] Field of Search .............................. 358/426, 428, 358/444, 404, 451, 525, 528, 539, 524, 501, 401; 382/233, 299, 232; 395/164, 162; 348/441, 240, 448, 450, 581, 751, 716, 717, 554, 561, 439; 345/197, 196, 198, 201

[56] References Cited

U.S. PATENT DOCUMENTS

| | | | |
|---|---|---|---|
| 4,646,133 | 2/1987 | Blanchard et al. | 348/450 |
| 4,740,832 | 4/1988 | Sprague et al. | 348/717 |
| 4,740,842 | 4/1988 | Annegarn et al. | 348/452 |
| 4,814,873 | 3/1989 | Maekawa | 348/448 |
| 5,119,193 | 6/1992 | Naji | 348/629 |

*Primary Examiner*—Edward L. Coles, Sr.
*Assistant Examiner*—Fan Lee
*Attorney, Agent, or Firm*—Fay, Sharpe, Beall, Fagan, Minnich & McKee

[57] ABSTRACT

A picture decoding apparatus has a memory for storing decoded picture data, three line buffers for temporarily storing picture data read from the memory, and a line buffer controller. Two of the three line buffers are selected sequentially and cyclically, and their operation modes are changed over to the writing mode, and decoded picture data read from the memory is stored sequentially in the two line buffers. The two line buffers are changed over from the writing mode to the reading mode sequentially and cyclically in the same order as that in which the two line buffers selected sequentially and cyclically were changed over to the writing mode, and data for one line is read sequentially from the two line buffers. While an earlier-selected one of the selected two line buffers is changed over to the reading mode and picture data for the former half of one line stored in the line buffer is read out therefrom, the remaining line buffer is changed over to the writing mode and picture data for the former half of a subsequent one line is stored therein. While a later-selected one of the two selected line buffers is changed over to the reading mode and picture data for the latter half of the said one line stored therein is read out therefrom, the earlier-selected line buffer is changed over to the writing mode and picture data for the latter half of the subsequent line is stored therein.

7 Claims, 9 Drawing Sheets

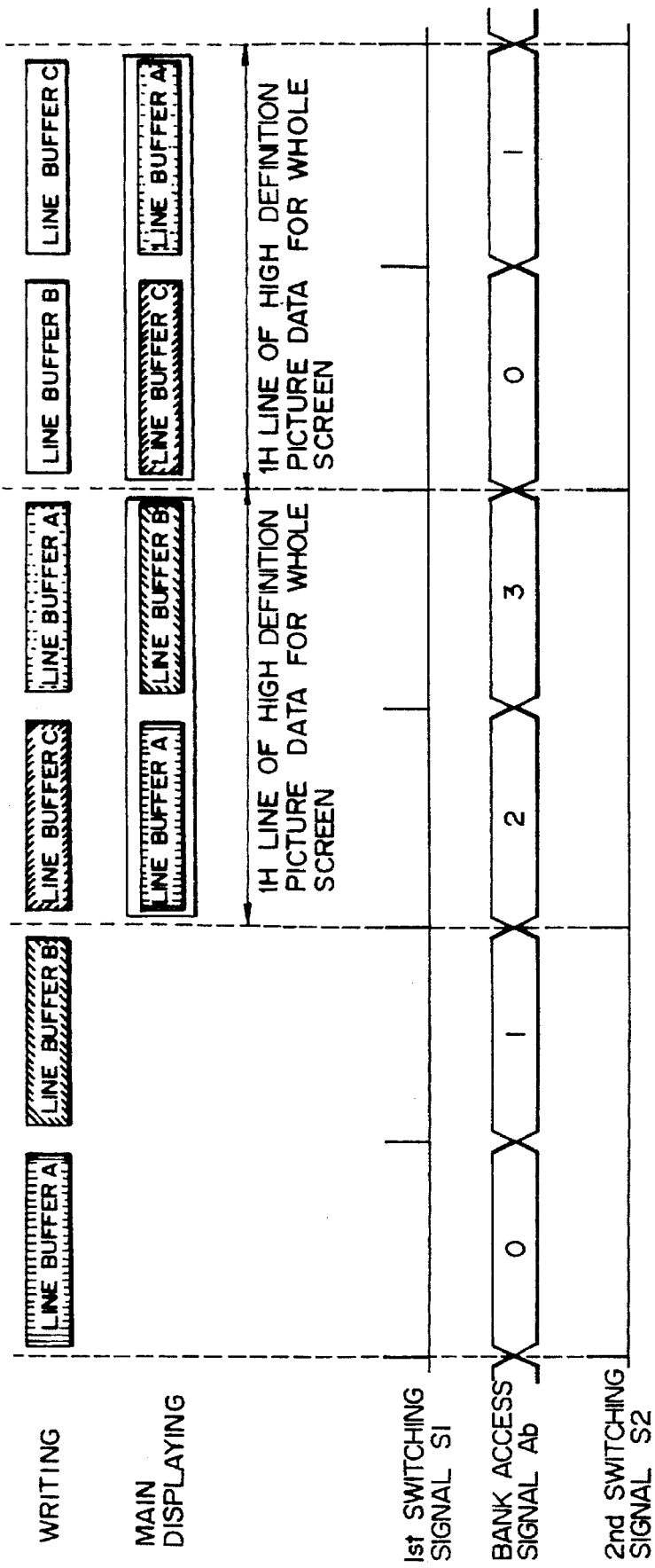

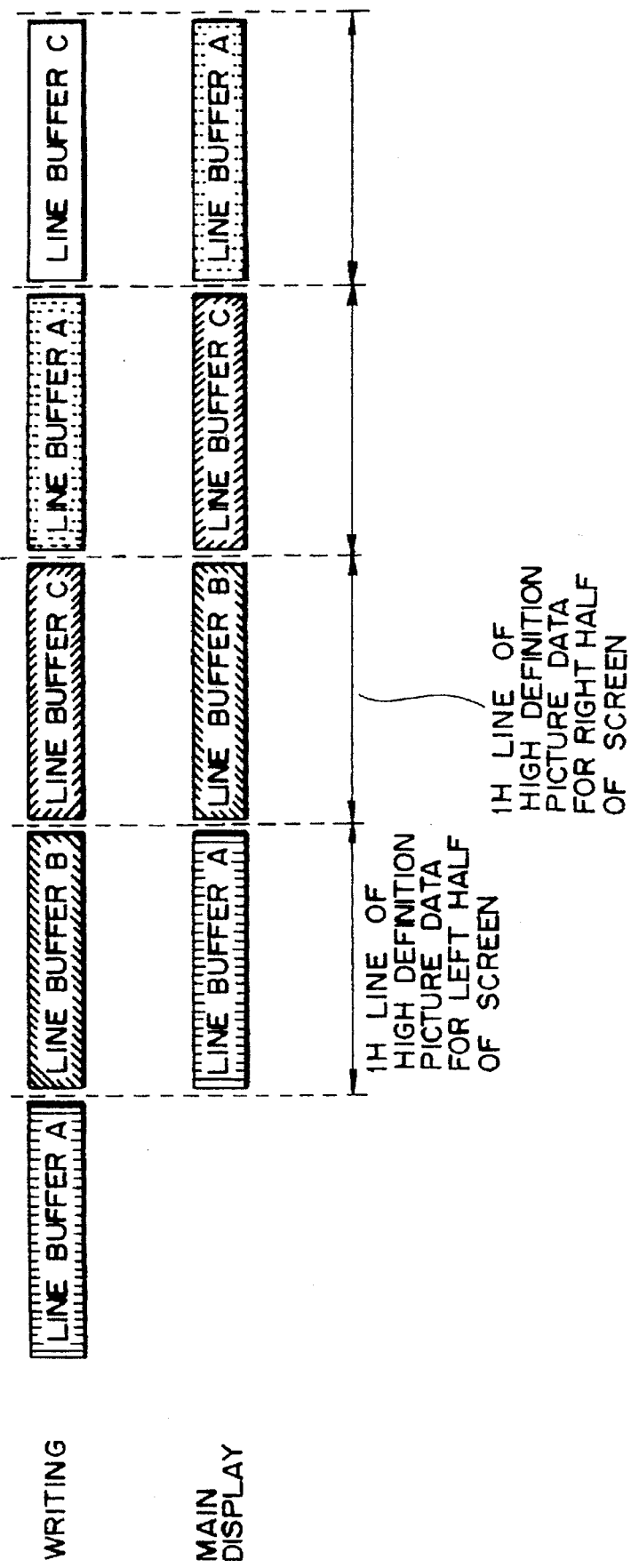

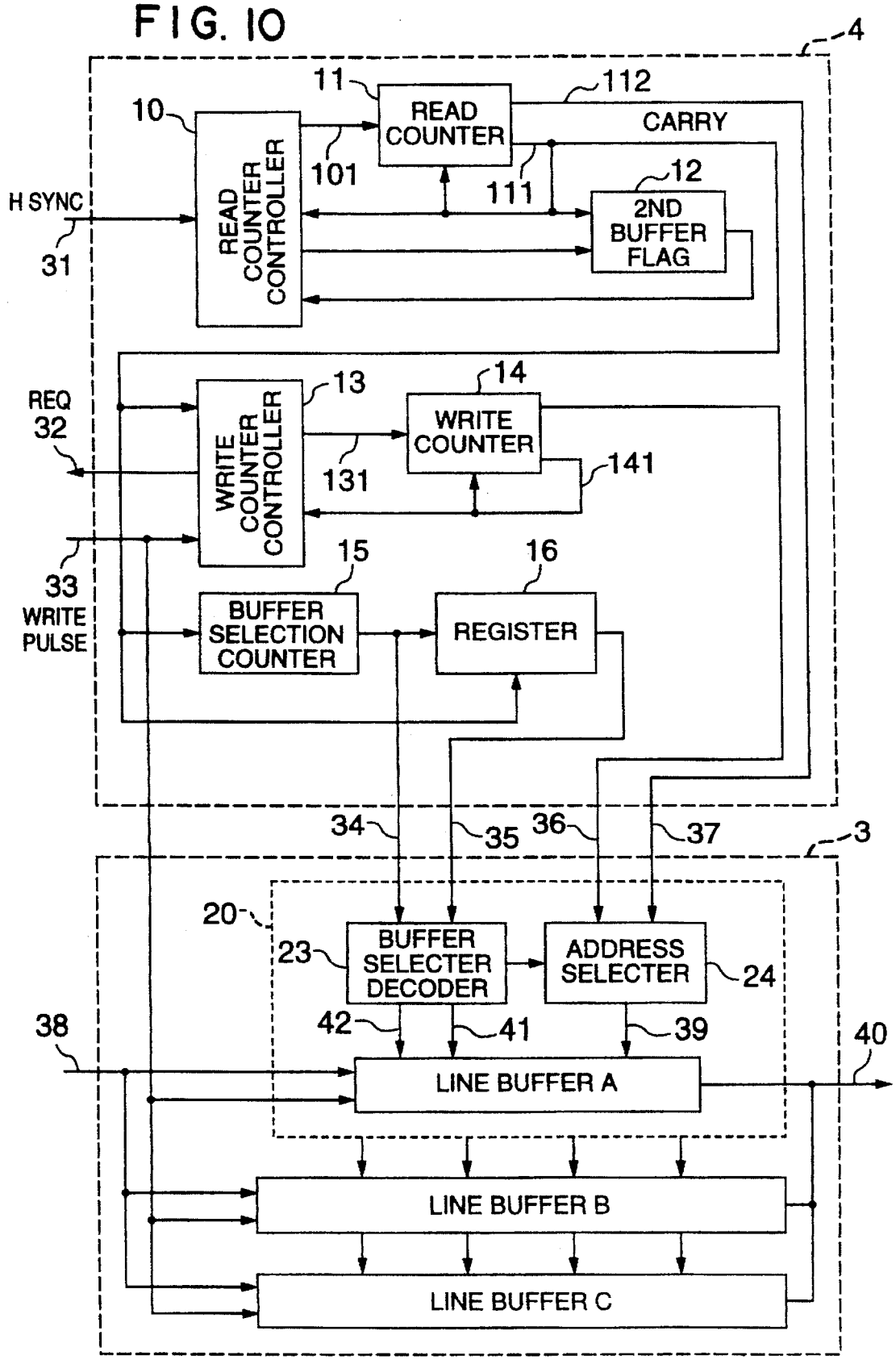

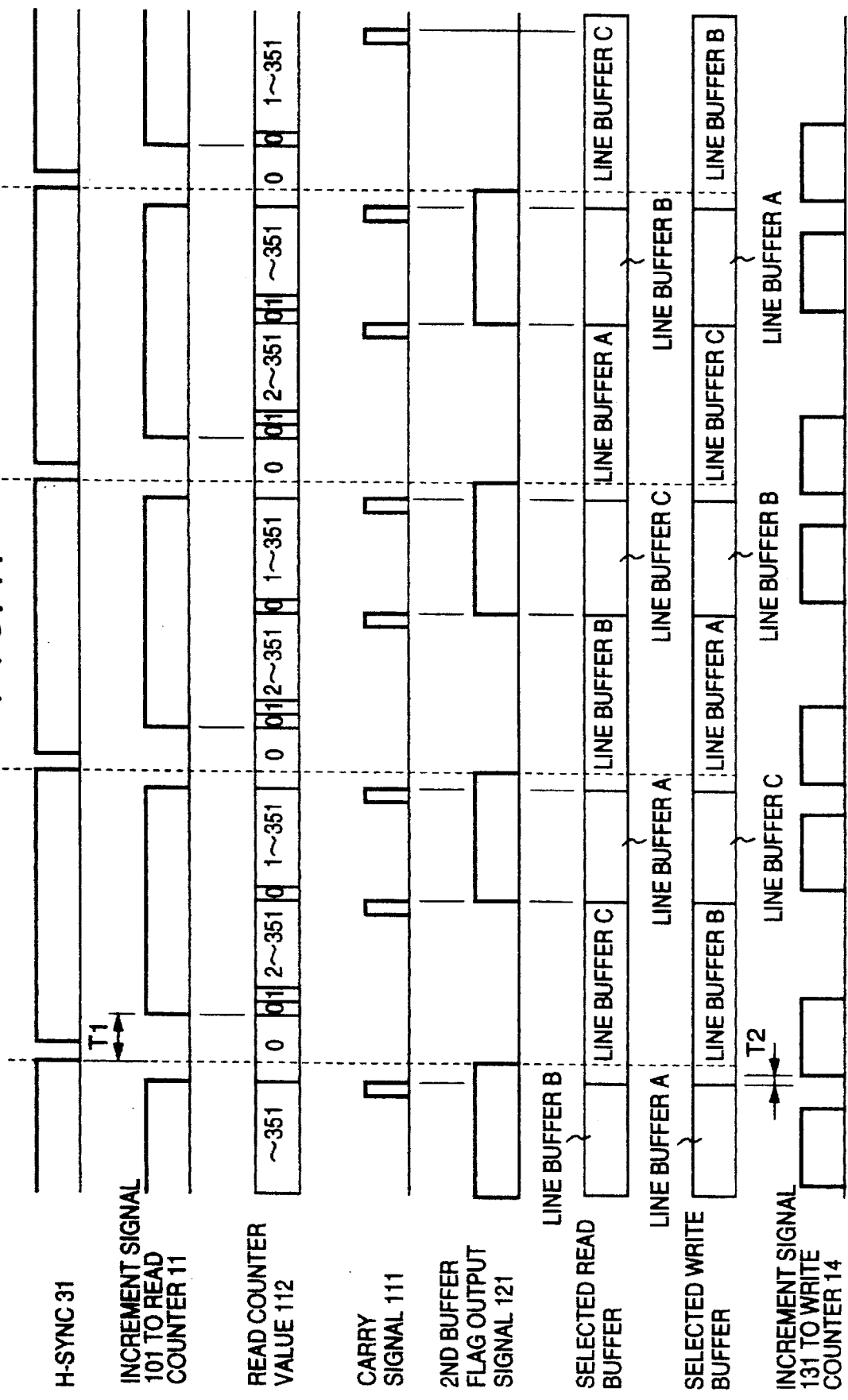

MOVING PICTURE DECODING APPARATUS HAVING THREE LINE BUFFERS CONTROLLED TO STORE AND PROVIDE PICTURE DATA OF DIFFERENT RESOLUTIONS

BACKGROUND OF THE INVENTION

This invention relates to a technique which is effective when applied to a moving picture decoding apparatus, and more particularly to a moving picture decoding apparatus suitable for displaying moving pictures and still pictures of high resolution.

In the conventional moving picture decoding apparatus, there are provided some line buffers each capable of storing data for one line of a picture, and those line buffers are used in turns to write and read data to thereby improve the data transfer efficiency. To give an example, when pixel data of a standard size of 352×240 dots as a format of a moving picture is outputted to form a picture of 704×480 dots which comply with the ordinary resolution of TV, the line buffers are changed over in the sequence as shown in FIG. 1, for instance.

In this example, three line buffers are used, one of them is allocated to writing of pixel data of the next line therein, and the remaining two line buffers are allocated to reading of pixel data therefrom. The reason why two buffers are required for reading is to realize data interpolation in the vertical direction to expand picture data for 240 lines to picture data for 480 lines. For vertical inter-line interpolation, it is necessary to simultaneously provide data for a line which is being displayed at present (hereafter referred to as main display data) and data for a line which is going to be displayed next (hereafter referred to as subsidiary display data). Based on those two items of data, interpolation data is calculated and displayed.

Assuming that one cycle consists of a sequence of writing and reading data for one line (hereafter referred to as 1H), an example of a manner of the change-over between writing and reading operation modes of the buffers is as shown in FIG. 1. While a line buffer for data writing is selected for every 1H cycle in the order of A to B to C, subsidiary display data are read from another selected buffer in the order of C to A to B, and main display data are read from yet another selected buffer in the order of B to C to A. If attention is paid to a certain buffer, in a 1H cycle after a particular 1H cycle where a data was written in that buffer, the written data is read from therefrom as subsidiary display data, and in the next 1H cycle, the written data is read again from that buffer as main display data. In the subsequent cycle, new data is written again in that buffer, and reading and writing are repeated in the same sequence.

The three buffers are controlled such that they perform a data writing operation, a subsidiary display data reading operation and main display data reading operation, respectively, and that their operations are changed-over at every 1H cycle among the three modes of operations cyclically. In displaying moving pictures, as shown in FIG. 2, since moving picture data contains 352 dots in comparison with a display size of 704 dots a line, each dot is displayed twice for each line.

For outputting 704×480 pixels in a typical high definition picture format on a screen of a 704×480 dot-size, vertical interpolation is not required, so that the number of line buffers required is two, one for writing and one for reading, and each line buffer needs to have a storage capacity of data for 704 pixels. In other words, in order to realize an apparatus capable of outputting both a standard picture (352×240 dots) and a high definition picture (704×480 dots) by the conventional method, it is necessary to prepare a line buffer for a standard picture, which is capable of storing data for 352 pixels, and two line buffers for a high definition picture, each of which is capable of storing data for 704 pixels.

In the conventional moving picture decoding apparatus, each line buffer is required to store all pixel data for one line. Therefore, when the amount of data for one line differs, for example, between a standard picture and a high definition picture as described above, there occurs a waste of line buffer capacity, and when a plurality of line buffers are prepared for a change-over between the modes of operation, reading and writing, the waste of the buffer capacity increases, resulting an increase of the cost of the apparatus.

SUMMARY OF THE INVENTION

An object of the present invention is to provide a picture decoding apparatus capable of outputting both a standard picture and a high definition picture with a functionally required minimum number and configuration of line buffers, and to provide a picture output method with such picture decoding apparatus.

According to one aspect of the present invention, the picture decoding apparatus comprises a decoder for decoding coded picture data, a memory for storing decoded picture data, three line buffers for temporarily storing picture data read out of the memory, and a line buffer control block for controlling the line buffers. The line buffer control block controls the three line buffers as follows:

a) Two line buffers (A, B; C, A; B, C) are selected sequentially and cyclically among the three line buffers (A, B, C), and the so selected two line buffers are set one after the other in the writing operation mode so that decoded picture data for one line read out from the memory are stored therein;

b) Two line buffers selected sequentially and cyclically are changed over from the writing mode to a reading operation mode one after the other in the same order as that in which the two line buffers were set in the writing mode, and data for one line are read from the two line buffers sequentially;

c) Of the selected two line buffers (A, B; C, A; B, C) changed over to the writing mode, the line buffer selected earlier (A; C; B) is changed over to the reading mode, and while a picture data for the former half of one line stored therein is being read out, the remaining one line buffer (C; B; A) of the three line buffers is changed over to the writing mode and picture data for the former half of the subsequent one line is stored therein.

d) Of the two line buffers (A, B; C, A; B, C) changed over to the writing mode, the line buffer selected later (B; A; C) is changed over to the reading mode, and while picture data for the latter half of one line written therein is being read out, the earlier-selected one (A; C; B) of the selected two line buffers in the writing mode is now changed over to the writing mode and picture data for the latter half of the subsequent one line is stored therein.

According to another aspect of the present invention, the picture decoding apparatus comprises thee line buffers each having a capacity for storing standard picture data for one line, that is, for n pixels (n is a positive integer), and when a high definition picture is to be outputted, data for one line, in other words 2n pixels, is stored by using two of the three line buffers.

More specifically, in an embodiment of the present invention, when a high definition picture is to be outputted, decoded data for one line, that is, decoded 2n pixels are stored in two (A, B) out of three line buffers (A, B, C). While data for the left half of the first line are outputted from one line buffer (A), data for the left half of the second line are stored in the remaining line buffer (C). While data for the right half of the first line are outputted from the other line buffer (B), data for decoded n pixels for the right half of the second line are stored in the line buffer (A) from which data has already been outputted. Next, for the second line, pixel data are outputted from the line buffers C and A in that order, and concurrently with this, data for the third line are written in the line buffers B and C in that order. Hereafter, data is outputted from the line buffers B and C in that order, and concurrently with this, data are written in the line buffers A and B in that order. The line buffers are controlled by a control circuit to change over the operation modes to repeat the above-mentioned sequence of read and write operations.

By changing over the operation modes as described above, vertical interpolation can be performed by use of line buffers each capable of storing standard picture data for one line and controlling input and output of the data. When a high definition picture, which contains twice as much data as in a standard picture, is to be outputted, data for one line is stored by using two buffers, so that data can be inputted and outputted for display of a high definition picture without changing the number and the configuration of the line buffers.

BRIEF DESCRIPTION OF THE DRAWINGS

FIG. 5 is a timing chart for explaining an operation of the line buffer block and the line buffer control block when a high definition picture is displayed in an embodiment of the present invention.

FIG. 8 is a timing chart for explaining an operation of line buffers when a high definition picture is displayed only in the right half of the screen in an embodiment of the present invention.

FIG. 10 is a diagram showing examples of structures of the line buffer control block and the line buffer block shown in FIG. 3.

FIG. 11 is a waveform diagram illustrating operations of the structures shown in FIG. 10.

DESCRIPTION OF THE PREFERRED EMBODIMENTS

Embodiments of the present invention will be described with reference to the accompanying drawings.

Figure 3:
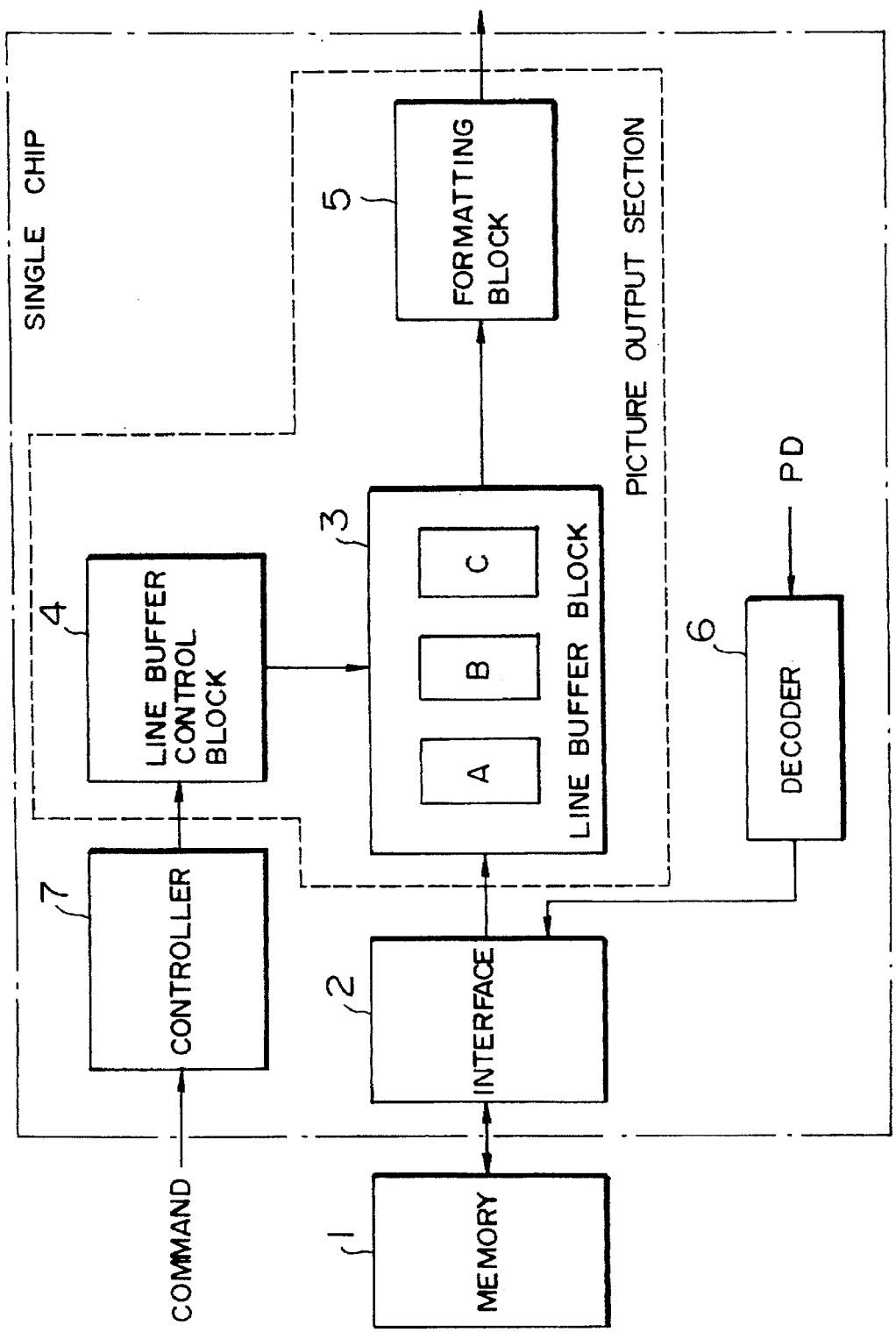
FIG. 3 is a block diagram showing a general construction of a picture decoding apparatus according to an embodiment of the present invention.

FIG. 3 is a block diagram of a picture decoding apparatus. The apparatus includes, in this embodiment, a memory 1 for storing decoded picture data, a decoder 6 for decoding coded picture data a controller 7, an interface 2, and a picture output section having a line buffer block 3, a line buffer control block 4 and an output formatting block 5. Compressed and coded picture data PD (picture data read from CD-ROM, for example) supplied from a host control unit, such as a microprocessor, is inputted to the decoder 6, where it is decoded, and stored through an interface 2 into memory 1. In the picture output section, picture data are read from the memory 1 through the interface 2 and supplied to the line buffer block 3, which contains three line buffers.

The line buffer control block 4 controls the operation of the three line buffers in the line buffer block 3 to switch them between the writing and reading operation modes. The operation of the line buffer control block 4 is controlled by a controller 7. The controller 7, on the basis of information included in a command from the host microcomputer, supplies a discrimination signal regarding whether picture data is of a standard picture or a high definition picture. In response to the discrimination signal from the controller, the line buffer control block 4 controls the line buffer block 3. Data read from the line buffers are supplied to the output formatting block 5, where horizontal and vertical interpolations and filter processing such as conversion of Y and C signals into R, G and B color signals are performed, and the signals are delivered as picture data to a display device. The components shown in FIG. 3 enclosed by the chain line may be integrated with a single chip.

Figure 4:
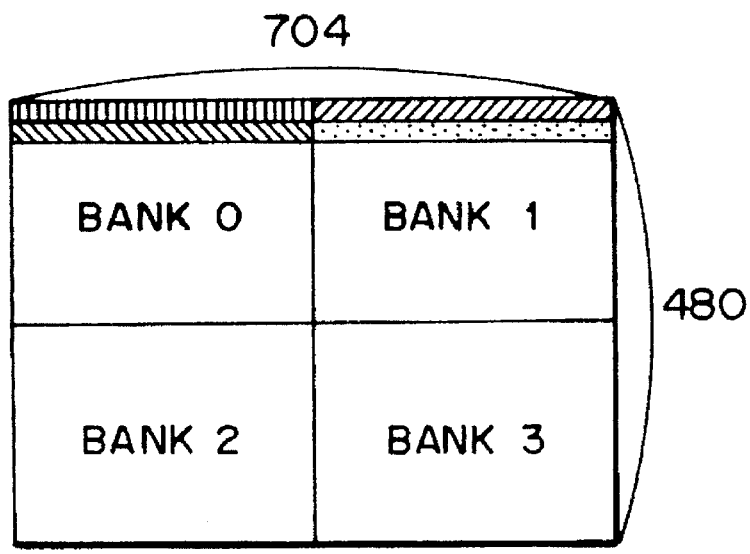
FIG. 4 is a diagram for explaining a memory map and an operation of a memory (a frame memory) according to the embodiment in FIG. 3.

FIG. 4 is a memory map of the memory 1 mentioned above. FIG. 5 is a timing chart showing how the operation modes are changed over for outputting a high definition picture by the line buffer block 3 and the line buffer control block 4. Banks 0, 1, 2 and 3 in the memory 1 each have a capacity of 352×240 dots corresponding to one standard moving picture frame. For outputting a high definition picture, all of the banks 0, 1, 2 and 3 are used. When picture data output is requested, decoded picture data are read from the banks 0, 1, 2 and 3 and stored in the line buffers A, B and C, each of which has a capacity of data for 352 dots.

Description will first be made of a case in which a high precision picture data of 704 dots×480 lines are written in the line buffers.

In this case, with regard to a first line, data in the bank 0 corresponding to pixel data for the former half of the line is written in the line buffer A, and then like with the standard moving picture, the operation mode is switched and data in the bank 1 corresponding to pixel data for the latter half line is written into the line buffer B. In this way, data for one line, being divided into two halves, is stored in two line buffers. See bank access signal Ab concerning the four banks shown in FIG. 4. While pixel data for the latter half of the next line is read from the bank 0 and written into the line buffer C, the line buffer A is placed in the reading mode and data is read out from the line buffer A. After the data has been read out from the line buffer A, data for the latter half of the next line is read from the bank 1 and written into the line buffer A, during which data of the line buffer B is read out.

As has been described, while data for one line is written by using two line buffers selected sequentially and cyclically among the three line buffers and placed in the writing mode sequentially (one after the other), two line buffers selected sequentially and cyclically are sequentially (one after the other) placed into the reading mode to read data for one line from them. The line buffer control block 4 generates a first switching signal S1 to change over among the three line buffers for the writing operation mode and a second switching signal S2 indicative of a start or an end of one line to effect a change-over between two pairs of line buffers selected sequentially and cyclically for the reading operation mode, where by data for each one line written over two line buffers are controllably read out therefrom. The second switching signal S2 serves to prevent a buffer memory control signal, which includes an address or the like indicating a position on a line being displayed, from being changed over until the display of one line is finished even when change-over between line buffers is effected for reading and writing modes in response to the first switching signal S1. As a result, it is possible to control two line buffers as if they were one line buffer.

Figure 6:
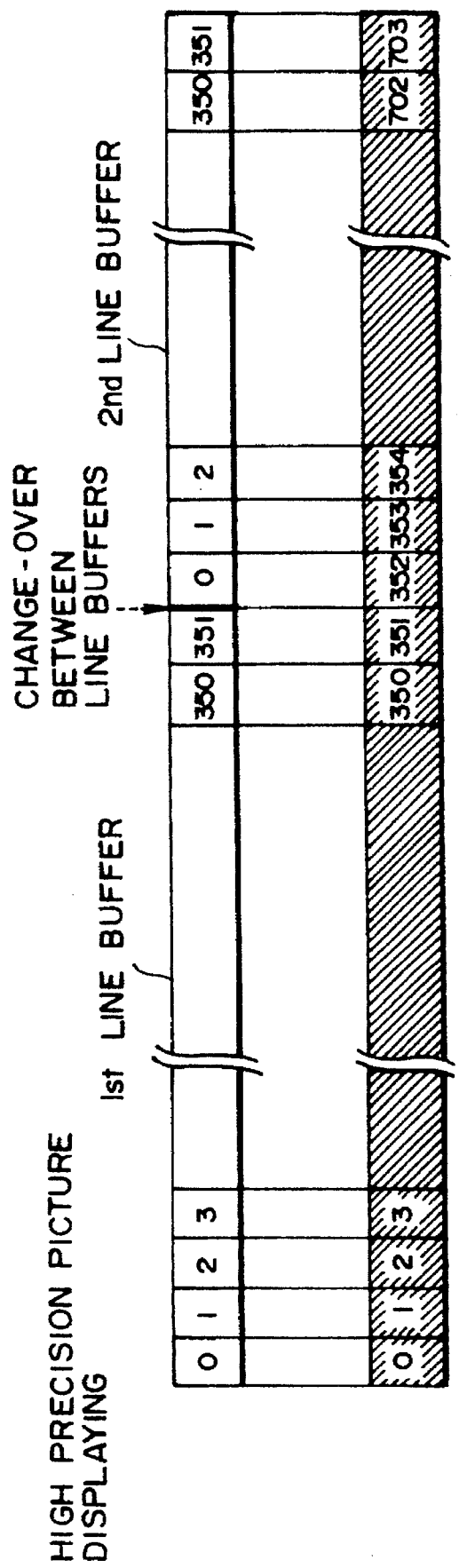
FIG. 6 is a diagram for explaining line buffer addresses and a sequence of pixel display when a high definition picture is displayed in an embodiment of the present invention.

FIG. 6 is a diagram showing the line buffer addresses and a sequence of pixel display for outputting a high definition picture. In the case of a display size of 704 dots a line, two line buffers are used to realize a data of 1 byte×704 for one line. As has been described, each line buffer stores a data for 352 dots, so that after a data for the left half of a line of a picture (pixel data for the former half of a line) is read out from a first one line buffer, it is changed over to the other, second line buffer, from which a data for the right half of the line (pixel data for the latter half of the line) is read out.

Figure 7:
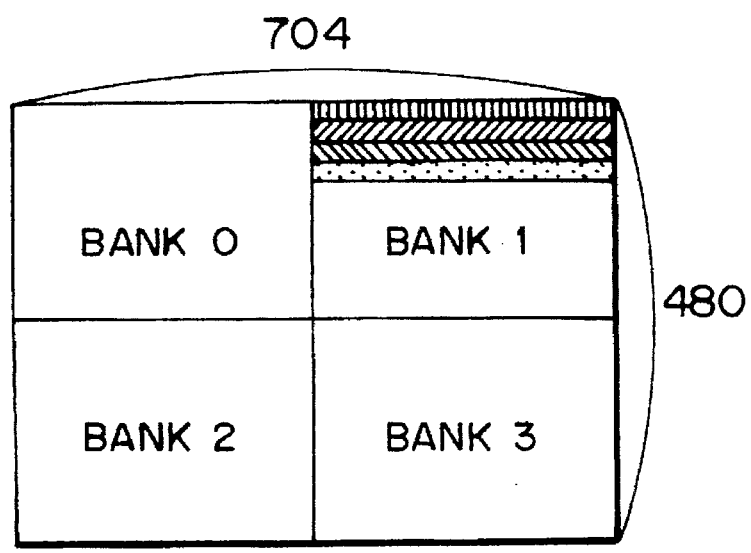
FIG. 7 is a diagram for explaining an operation of a memory (a frame memory) when a high definition picture is displayed only in the right half area of the screen.

FIG. 7 is a memory map of the frame memory (memory 1) when only the right half of a high definition picture is displayed, and FIG. 8 is a timing chart showing how the operation modes are changed over for the line buffers. As shown in FIG. 7, it is assumed that the frame memory is divided into four regions and they are designated as bank 0, bank 1, bank 2 and bank 3. When display is started with banks 1 and 3, one line buffer is only required for one line.

With one line buffer used for one line, the change-over between the writing and reading modes may be effected as shown in FIG. 8. In this case, since a data for one line can be stored in one line buffer, the change-over of the line buffers and the change-over from one line to another in display is effected concurrently. In the case of high definition picture data, only data for main display is required, and it is not required to read the next data as data for subsidiary display. In the embodiment shown in FIG. 8, the three line buffers are controlled by the line buffer control block 4 such that the buffer in which a data was just written is placed in the reading mode to output the data for main display in the next cycle.

In the embodiment described above, only one kind of picture data has been used, but when two kinds of data, luminance signal data and color difference signal data, for example, are used, the above-mentioned embodiment may be applied to each of those signal data. To be more specific, three line buffers are provided for each of the luminance signal data and the color difference signal data, and those line buffers are controlled by the line buffer control block 4.

Figure 9:
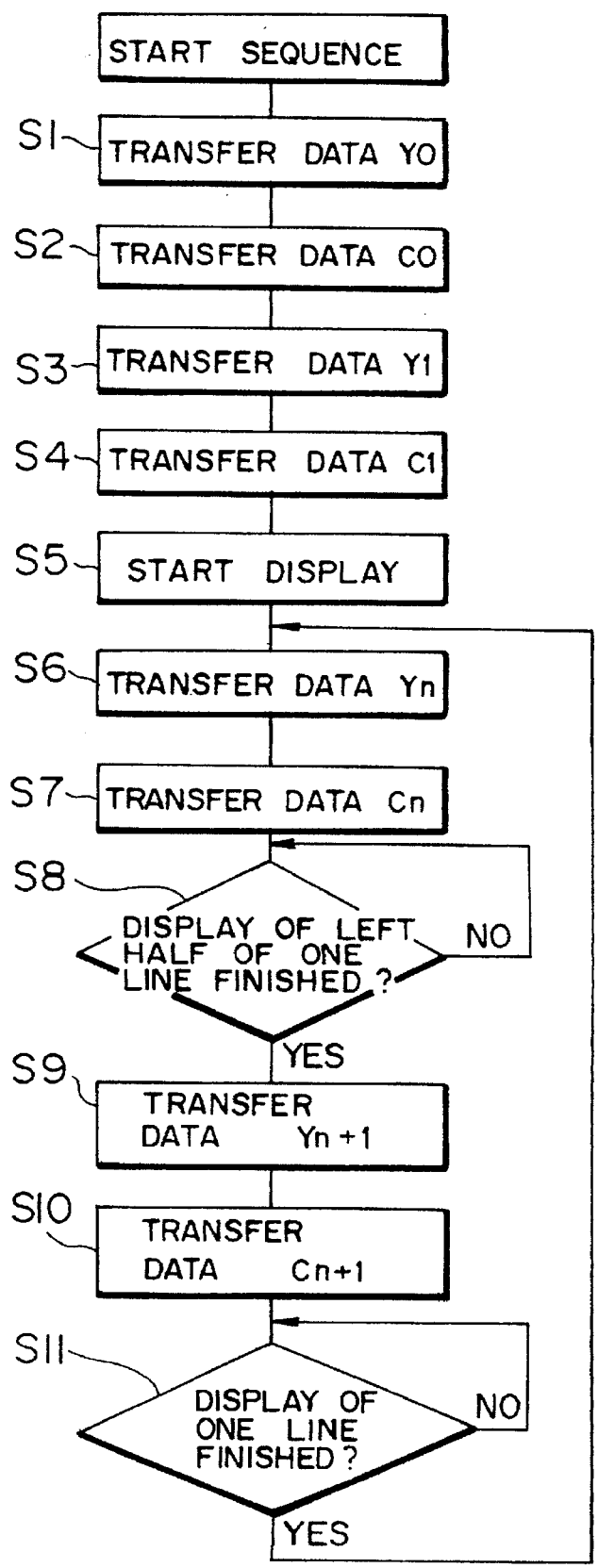
FIG. 9 is a flowchart showing an example of a procedure for transferring data of the line buffers in an embodiment of the present invention.

FIG. 9 shows an example of procedure of transferring data of the line buffers in this case. In compliance with FIG. 4, the luminance signal data and the color difference signal data for a first line stored in bank 0 are designated by Y0 and C0, and the luminance signal data and the color difference signal data for the first line stored in bank 1 are designated by Y1 and C1. Similarly, for a second line, those signals stored in bank 0 are designated by Y2 and C2, and those signals stored in bank 1 are designated by Y3 and C3. On the other hand, the line buffers for the luminance signal data are called line buffers A, B and C, and the line buffers for the color difference signal data are called line buffers D, E and F.

Decoded picture data for the first line is transferred from memory 1 to the line buffers A, D, B and E in the order of Y0, C, Y1 and C1 (steps S1 to S4). And, according to the picture display timing, the display of the first line is started (step S5). The line buffer A holding a luminance signal data and the line buffer D holding a color difference signal data are allocated for display (operating in the reading mode). While data Y0 and C0 are being output to display the left (former) half of the first line, data Y2 and C2 are written into the line buffers C and F in the writing mode (steps S6 and S7). The moment the display of the left (former) half of the first line is finished, the line buffers B and E shift to the reading mode and data Y1 and C1 are read out therefrom to display the right (latter) half of the first line. While the display of data Y1 and C1 is in progress, data Y3 and C3 for the second line are written in the line buffers A and D in the writing mode (steps S8 to S10). The moment the display of the first line is finished, the sequence returns from S11 to S6, and the steps S6 to S11 are repeated for the second line and beyond.

FIG. 10 shows an example of a structure of each of the line buffer control block 4 and the line buffer block 3 shown in FIG. 3, while FIG. 11 is a diagram useful for explaining operations of the blocks 4 and 3.

Figure 1:
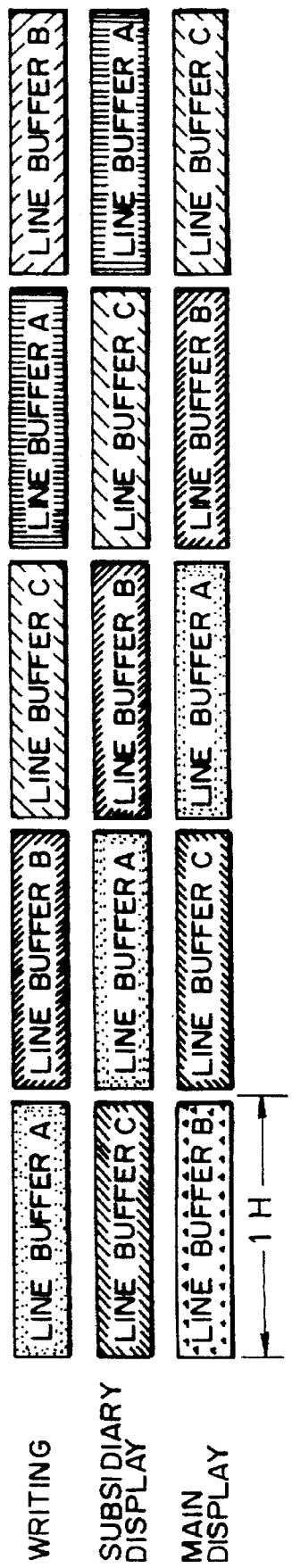
FIG. 1 is a timing chart showing an operation mode change-over sequence of line buffers in the conventional moving picture decoding apparatus.
Figure 2:
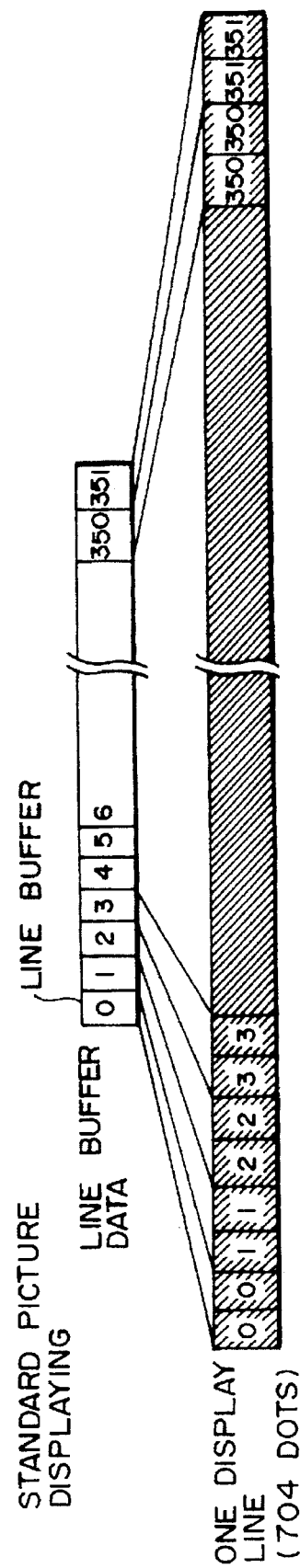
FIG. 2 is a diagram schematically showing how picture data are handled when a moving picture is displayed in the conventional moving picture decoding apparatus.

Description will be first made with reference to FIG. 10. Reference numeral 4 denotes the line buffer control block, and 3 denotes the line buffer block, both shown in FIG. 3. Reference numeral 10 denotes a read counter controller for controlling a read counter 11 which generates addresses for reading data. A second buffer flag 12 includes a flip-flop which is set by a carry signal from the read counter 11 and reset by a signal from the read counter controller 10. The second buffer flag 12 serves to detect that a line buffer to be secondly or later read for one horizontal scanning period has been selected for displaying (or outputting) high definition picture data. A write counter controller 13 controls a write counter 14 which generates addresses for writing data in the line buffers. A buffer selection counter 15 includes a ternary counter which generates a buffer select signal for selecting the three line buffers one after another cyclically. A register 16 serves to store an output of the buffer selection counter 15. A buffer select decoder 23 is a decoder circuit for generating a write signal 42 or a read signal 41 when a corresponding line buffer is selected. An address selector 24 serves to select one of the address signals 36 and 37 described later according to whether the system is in the write mode or read mode. The line buffers A, B and C are those which are shown in FIG. 1.

The operation of the circuit will now be described referring to FIG. 11. When a horizontal sync. signal 31 is supplied, the read counter controller 10 resets the second buffer flag 12. After an elapse of time T1 which complies with display timing, the read counter controller 10 supplies an increment signal 101 to the read counter 11. While the increment signal is at HIGH level, the read counter 11 performs up-counting at a fixed period corresponding to the display speed. The moment the count value reaches 351, the read counter 11 produces a carry signal 111. As the carry signal 111 occurs, the read counter 11 is reset to 0 to re-start up-counting, and the second buffer flag 12 is reset and determines that a second buffer to be secondly or later read for one horizontal scanning period has been selected for displaying or outputting high definition picture data. The moment the count value reaches 351 again, the read counter 11 produces a carry signal 111, which is supplied to the second buffer flag 12 to cause it to be set and is also supplied to the read counter controller 10. As a result, the increment signal 101 from the read counter controller 10 is changed from HIGH to LOW level, and holds this state. Thus, the read counter 11 performs an up-count operation from 0 to 351 sequentially twice and halts. When another horizontal sync. signal 31 is issued in this state, the above-mentioned sequence of actions will be repeated.

When the carry signal 111 is supplied from the read counter 11, the write counter controller 13 starts an operation of writing data into the line buffers. First, the write counter controller 13 supplies a data write request signal 32 to the interface 2 (FIG. 3) and waits for display data to be transferred from memory 1 (FIG. 3). After an elapse of time T2, the write counter controller 13 receives a write pulse 33 and write data 38 from the interface 2. Whereupon, the write counter controller 13 produces an increment signal 131 to cause the write counter 14 to perform up-counting. The write period being usually shorter than the read period, the write counter counts up to 351 in rather a short time to generate a carry signal 141. When the carry signal 141 occurs in the write counter 14, the write counter 14 itself is reset, and the write counter controller 13 stops the writing action.

Each time a carry signal 111 is supplied from the read counter 11, the buffer section counter 15 increments sequentially, i.e., performs an up-count operation, and generates a read buffer selection signal 34. The register 16 stores, in response to a carry signal 111 from the read counter 11 a signal (value) which is one less than the count of the buffer selection counter 15 and generates it as a write buffer selection signal 35. For this reason, the line buffer which was used for reading immediately before is now automatically selected for writing. The buffer select decoder 23 receives the read buffer select signal 34 and the write buffer select signal 35, so that when a corresponding line buffer is selected, the decoder 23 supplies a write signal 42 and a read signal 41 to the corresponding line buffer. The address decoder 23 supplies a signal for selecting either a write address signal 36 or a read address signal 37. Reference numeral 40 denotes a signal read from the line buffers A to C for display.

The present invention has been described with reference to the embodiments mentioned above, but the present invention is not limited to those embodiments and needless to say, changes and variations may be made without departing from the spirit and scope of the present invention.

As described above, by controlling the writing and reading operations of the line buffers each having a capacity for picture data for one line, without changing the number and the configuration of the buffer memories, it is possible to store picture data twice as much as data of a standard picture and to control input and output of picture data, so that the required capacity of the buffer memories can be reduced and the cost of the apparatus can be decreased substantially.

We claim:

1. In a picture decoding apparatus for decoding a first coded picture of a first resolution of n pixels/line and a second coded picture of a second resolution of 2n pixels/line, the picture decoding apparatus comprising a decoder for decoding coded picture data; a memory for storing decoded picture data; three line buffers, each capable of storing data for n pixels, for temporarily storing picture data read from said memory; and a line buffer controller for controlling writing and reading operations of each of said line buffers, a method for outputting, through said line buffers, decoded picture data of said second resolution stored in said memory, comprising the steps of:

sequentially and cyclically selecting two out of said three line buffers and sequentially storing decoded picture data for one line, read from said memory, in said two line buffers;

sequentially reading data for one line from said two line buffers selected sequentially and cyclically;

while reading picture data for the former half of one line from an earlier-selected line buffer of the two line buffers selected sequentially and cyclically, storing picture data of the former half of a subsequent one line into the remaining line buffer;

while reading picture data for the latter half of said one line from a later-selected line buffer of the two line buffers selected sequentially and cyclically, storing picture data for the latter half of said subsequent line into the earlier-selected line buffer of the two line buffers selected sequentially and cyclically.

2. A method according to claim 1, wherein one line whose data is stored in said two line buffers selected sequentially and cyclically is one line to be displayed immediately after the one line whose data is read from the two line buffers selected sequentially and cyclically.

3. In a moving picture decoding apparatus for decoding a first coded picture of a first resolution of n pixels/line and a second coded picture of a second resolution of 2n pixels/line, the picture decoding apparatus comprising a decoder for decoding coded picture data each including a luminance signal component and a chrominance signal component; a memory for storing a luminance signal component and a chrominance signal component of decoded picture data; three first line buffers, each capable of storing luminance signal component data for n pixels, for temporarily storing picture data read from said memory; three second line buffers, each capable of storing chrominance signal component data for n pixels, for temporarily storing picture data read from said memory; and a line buffer controller for controlling writing and reading operations of each of said first and second line buffers, a method for outputting, through said line buffers, decoded picture data of said second resolution stored in said memory, comprising the steps of:

sequentially and cyclically selecting two out of said three first line buffers, and storing decoded luminance component data for one line, read from said memory, in said two first line buffers sequentially;

sequentially and cyclically selecting two out of said three second line buffers, and storing decoded luminance component data for one line, read from said memory, in said two second line buffers sequentially;

reading luminance component data for one line from two first line buffers selected sequentially and cyclically;

reading color component data for one line from two second line buffers selected sequentially and cyclically;

while reading luminance component data for the former half of one line from an earlier-selected first line buffer said two first line buffers selected sequentially and cyclically, storing luminance component data for the former half of one line in the remaining line buffer out of said three first line buffers;

while reading chrominance component data for the former half of one line from an earlier-selected line buffer of said two second line buffers selected sequentially and cyclically, storing color component data for the former half of a subsequent line in the remaining line buffer out of said three pieces of first line buffers;

while reading luminance component data for the latter half of said one line from a later-selected line buffer of said two first line buffers selected sequentially and cyclically, storing luminance component data of the latter half of said subsequent line in an earlier-selected line buffer of said two pieces of first line buffers selected sequentially and cyclically; and while reading color component data for the latter half of said one line from a later-selected line buffer of said two second line buffers selected sequentially and cyclically, storing color component data for the latter half of said subsequent line in an earlier-selected line buffer of said two second line buffers selected sequentially and cyclically.

4. A picture decoding apparatus for decoding a first coded picture of a first resolution and a second coded picture of a second resolution, wherein said first and second resolutions are respectively n pixels/line and 2n pixels/line, the apparatus comprising:

a decoder for decoding coded picture data;

a memory for storing decoded picture data;

three line buffers each capable of storing data for n pixels, for temporarily storing picture data read from said memory; and a line buffer controller for controlling writing and reading operations of each of said line buffers, wherein in order to decode said second coded picture data, said line buffer controller includes:

a) first means for sequentially and cyclically selecting two out of said three line buffers, placing said selected two line buffers in a writing operation mode, and thereby storing decoded picture data for one line sequentially in said two line buffers;

b) second means for sequentially and cyclically changing over said sequentially and cyclically selected two line buffers from the writing operation mode to a reading operation mode in the same order in which the selected two line buffers were placed in the writing mode, and then reading data for one line therefrom; and c) third means while an earlier-selected line buffer of said selected two line buffers placed in the writing mode is changed over to the reading mode and picture data for the former half of one line stored in said line buffer is read out therefrom by said second means, for changing over the remaining line buffer out of said three line buffers to the writing mode and for storing picture data for the former half of a subsequent line into said remaining line buffer, and fourth means, while a later-selected line buffer of said two line buffers placed in the writing mode is changed over to the reading mode and picture data for the latter half of said one line stored therein is read out therefrom by said second means, for changing over said earlier-selected one of the selected two line buffers to the writing mode and for storing picture data for the latter half of said subsequent line.

5. A picture decoding apparatus according to claim 4, wherein one line stored in each of said two line buffers selected sequentially and cyclically and changed over to the writing mode is one line to be displayed immediately after the one line whose data is read from the two line buffers selected sequentially and cyclically and changed over from the writing mode to the reading mode.

6. A picture decoding apparatus according to claim 4, wherein in order to decode said second coded picture data: picture data for one line including 2n pixels are serially stored by said line buffer controller in said two selected sequentially and cyclically out of the three line buffers and changed over to the writing mode; while picture data for n pixels for the former half of said one line is read out from an earlier-selected one of said selected two line buffers to output data for the former half of said one line including n pixels, the remaining line buffer out of said three line buffers is changed over to the writing mode and picture data for n pixels for the former half of a subsequent line is stored therein by said line buffer controller; and while picture data for n pixels for the latter half of said one line is read out from a later-selected one of said selected two line buffers to output the latter half of said one line including n pixels, an earlier-selected one of said selected two line buffers is changed over to the writing mode and picture data for n pixels for the latter half of said subsequent line is stored therein by said line buffer controller.

7. A picture decoding apparatus according to claim 4, further comprising additional three line buffers, wherein each of data of said second coded picture includes a luminance signal component and a chrominance signal component, the first-mentioned three line buffers being responsible for the luminance signal component, the second-mentioned, additional line buffers being responsible for the chrominance signal component, and wherein said first means serves to perform sequential and cyclic selection of two of the first-mentioned three line buffers and two of said additional three line buffers to store luminance signal component data and chrominance signal component data for one line, said second means serves to perform sequential and cyclic change-over of said selected two first-mentioned line buffers and said selected two second-mentioned line buffers to read data therefrom, said third means serves to perform change-over of the remaining first-mentioned line buffer and the remaining second-mentioned line buffer to store data therein, and said fourth means serves to perform change-over of the earlier-selected one of the selected two first-mentioned line buffers and the earlier-selected one of the selected two second-mentioned line buffers to store data therein.

* * * * *

UNITED STATES PATENT AND TRADEMARK OFFICE
CERTIFICATE OF CORRECTION

PATENT NO. : 5,646,694

DATED : July 8, 1997

INVENTOR(S) : K. HORITA et al

Page 1 of 2

It is certified that error appears in the above-indentified patent and that said Letters Patent is hereby corrected as shown below:

Column 1, line 48, delete "from".

Column 2, line 15, after "resulting" insert --in--; and
    line 62, change "thee" to --three--.

Column 4, line 47, delete "a" (second occurrence);
    line 48, change "are" to --is--; and
    line 52, change "then like" to --then, as--.

Column 5, line 10, change "where by" to --whereby-- and change "one"
    to --single--;
    line 45, change "only data for main" to --only the data for
    the main--;
    line 46, change "data for subsidiary" to --the data for the
    subsidiary--;
    line 50, after "for" insert --the--; and
    line 60, after "of" (first occurrence) insert --a--.

Column 7, line 18, change "2. Whereupon," to --2, whereupon--;
    line 31, after "11" insert --,--; and
    line 53, after "store" insert --twice as much--, delete "twice",
    and change "much as data" to --that--.

Column 8, line 50, claim 3, change "luminance" to --chrominance--;
    line 55, change "color" to --chrominance--;
    line 59, after "buffer" insert --of--;
    line 62, change "one" to --a subsequent--;
    line 65, after "earlier-selected" insert --second--; and
    line 67, change "color" to --chrominance--.

UNITED STATES PATENT AND TRADEMARK OFFICE
CERTIFICATE OF CORRECTION

PATENT NO. : 5,646,694
DATED : July 8, 1997
INVENTOR(S) : K. HORITA wt al

It is certified that error appears in the above-indentified patent and that said Letters Patent is hereby corrected as shown below:

Column 9, line 2, delete "pieces of";
    line 6, change "of" to --for--;
    line 8, delete "pieces of--;
    line 10, change "color" to --chrominance--; and
    line 13, change "color" to --chrominance--.

Column 9, line 44, claim 4, after "means" insert --for changing over--;
    line 49, delete "for changing over"; and
    line 53, after "means" insert --for changing over--.

Column 10, line 1, delete "for chang-"; and
    line 2, delete "ing over".

Column 10, line 33, claim 7, change "additional three" to --three additional--; and
    line 42, change "additional three" to --three additional--.

Signed and Sealed this

Seventh Day of July, 1998

*Attest:*

BRUCE LEHMAN

*Attesting Officer*      *Commissioner of Patents and Trademarks*